United States Patent
Wenstrup et al.

(10) Patent No.: US 7,152,502 B2
(45) Date of Patent: Dec. 26, 2006

(54) BOLTED PILOT WEB WITH PRECISION MACHINED BEARING STOP

(75) Inventors: Leo Wenstrup, Portage, MI (US); Gary Turner, Three Rivers, MI (US)

(73) Assignee: Dana Corporation, Toledo, OH (US)

( * ) Notice: Subject to any disclaimer, the term of this patent is extended or adjusted under 35 U.S.C. 154(b) by 424 days.

(21) Appl. No.: 10/698,266

(22) Filed: Oct. 31, 2003

(65) Prior Publication Data

US 2005/0092128 A1    May 5, 2005

(51) Int. Cl.
    F16H 57/02    (2006.01)
    F16H 57/04    (2006.01)
(52) U.S. Cl. .................. 74/606 R; 74/607; 180/346
(58) Field of Classification Search .............. 74/606 R, 74/607; 29/888.08, 888.01; 123/195 R; 475/220, 221, 230; 180/346
    See application file for complete search history.

(56) References Cited

U.S. PATENT DOCUMENTS

| | | | |
|---|---|---|---|
| RE14,201 E | 10/1916 | Niclausee et al. | |
| 1,536,824 A | 5/1925 | Domizi | |
| 2,098,451 A * | 11/1937 | Gilmore | ................. 29/888.01 |
| 2,426,593 A * | 9/1947 | Buckendale | ................. 475/204 |
| 2,609,710 A | 9/1952 | Osborn | |
| 3,605,965 A | 9/1971 | Thomas et al. | |
| 4,004,472 A | 1/1977 | Millward et al. | |
| 4,674,455 A * | 6/1987 | Tsuboi | ..................... 123/195 R |
| 4,719,677 A * | 1/1988 | Arnold | ..................... 29/888.08 |
| 5,207,121 A * | 5/1993 | Bien | ........................ 74/606 R |
| 5,913,745 A | 6/1999 | Inagaki et al. | |
| 6,024,666 A | 2/2000 | Bunnow | |
| 6,122,995 A * | 9/2000 | Gievers et al. | ........... 74/606 R |
| 6,544,140 B1 | 4/2003 | Gradu et al. | |
| 6,595,085 B1 * | 7/2003 | Osenbaugh | .................. 74/607 |
| 6,863,634 B1 * | 3/2005 | Holman et al. | ............. 475/221 |
| 7,004,277 B1 * | 2/2006 | Pollock et al. | ............. 180/346 |
| 7,086,983 B1 * | 8/2006 | Turner et al. | ................ 475/230 |
| 2003/0083171 A1 | 5/2003 | Turner et al. | |

FOREIGN PATENT DOCUMENTS

FR    2 832 481 A1    5/2003
GB    1 430 372    *    3/1976

* cited by examiner

*Primary Examiner*—Vinh T. Luong
(74) *Attorney, Agent, or Firm*—Marshall & Melhorn, LLC

(57) ABSTRACT

An improved differential carrier and pilot web for a vehicle comprises a carrier and a separate pilot web. The pilot web is attached to the carrier by at least two bolts. At least two bolts are each covered by a bushing. The carrier and the pilot web each preferably comprise counter bored holes to receive and support the bolt and bushing. The carrier and the pilot web each also have a mating stop surface, which are precision machined to be a minimal distance from one another.

10 Claims, 4 Drawing Sheets

BOLTED PILOT WEB WITH PRECISION MACHINED BEARING STOP

FIELD OF THE INVENTION

The present invention relates to a bolted pilot web with a precision machined bearing stop.

BACKGROUND OF THE INVENTION

A known bolted pilot web is found in U.S. Pat. No. 4,004,472. This patent describes a detachable bearing support secured to a housing by a series of bolts. The bearing support is made from cast iron to ensure that the inner bearing assembly does not work loose during operation of the differential unit. The bearing support is detachable in order to provide a method for mounting the drive pinion in the housing.

U.S. Pat. No. 6,544,140 provides a pinion mounting comprising a race attached to the casing of the differential gear mechanism by a plurality of bolts. The bolts are installed through a plurality of mounting holes in the radial flange of the race. The race is in constant contact with the casing, resulting in no gap therebetween.

The above-described designs have several disadvantages. Known heavy and single tandem axle designs include the integration of the pinion bearing cage into the carrier casting. Because of the relative shape and position of the pilot web relative to the remainder of the carrier assembly, casting the carrier as a single piece is more complex and not a cost effective casting process. Attempts at bolting the pilot web to the remainder of the carrier assembly have resulted in unacceptable transference of forces, and the bolts coming loose under load.

SUMMARY OF THE INVENTION

The present invention defines a pilot web and differential carrier assembly. A pilot web, with a first end and a second end, contains at least one aperture located at each of said first and second ends. A differential carrier comprises at least two apertures in complementary locations to said apertures of said pilot web. A first stop on the pilot web aligns with a second stop on the differential carrier. The second stop is disposed adjacent to, and aligned with, the first stop, with the first and second stops defining a gap therebetween. At least two bolts are disposed through the respective apertures of the pilot web and the differential carrier with bushings disposed about the at least two bolts.

BRIEF DESCRIPTION OF THE DRAWINGS

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
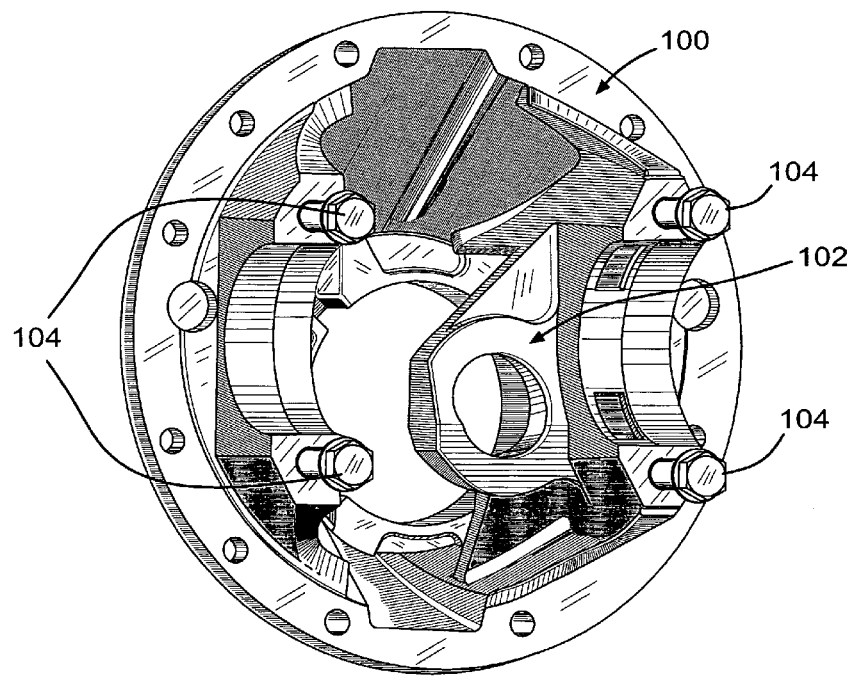
FIG. 1 is an illustration of a known carrier and pilot web.

FIG. 1 illustrates a known carrier assembly 100 with integral pilot web 102. As is standard in the known art, the pilot web 102 is cast as a unitary piece with the carrier 100. Mounting bolts 104 are provided for mounting the carrier assembly.

Figure 2:
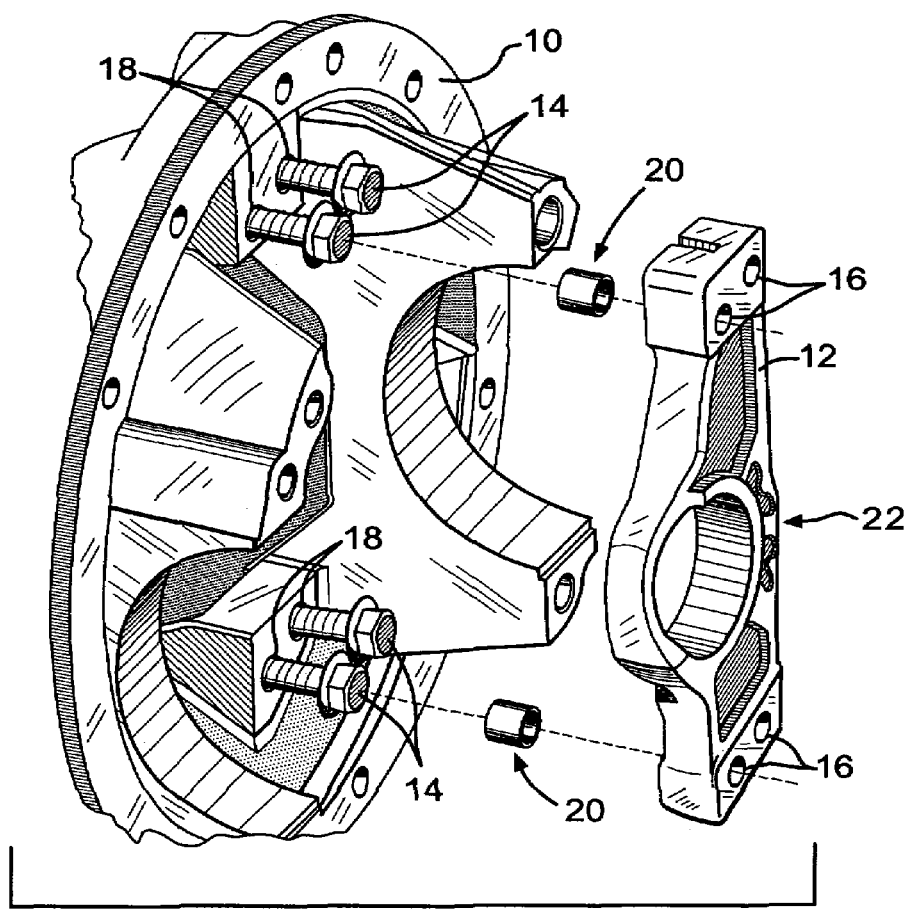
FIG. 2 is an exploded view of a pilot web and carrier assembly according to the present invention.

FIG. 2 illustrates a carrier assembly 10 and pilot web 12 according to the present invention. The pilot web of the present invention can be utilized to support the pilot bearing of the pinion that supports the ring gear of the differential. As illustrated, the carrier assembly 10 and pilot web 12 are formed as separate pieces. As shown in the illustrated embodiment of the present invention, preferably four mounting bolts 14 are provided to secure the pilot web to the carrier assembly. When four mounting bolts are used, they are disposed in pairs to mount the pilot web 12 to the carrier assembly 10. The mounting bolts 14 pass through holes 16 in the pilot web 12 and into holes 18 in the carrier assembly 10, to secure the pilot web 12 to the carrier assembly 10.

In service, loads of the pinion reacted through the pilot bearing can cause shear loads which can cause the mounting bolts 14 to loosen from the carrier assembly 10. Therefore, as a feature of the present invention, it has been found that bushings 20 or dowel bushings are preferably disposed about either two or four of the mounting bolts 14. The bushings serve to lock the pilot web 12 into position with the carrier assembly 10 and to absorb a great deal of the lateral forces. This addresses the concerns regarding the shear forces and helps secure the assembly of the pilot web 12 to the carrier assembly 10 under load. If there are two bushings 20 used, they would preferably be disposed about mounting bolts 14 on opposing corners, i.e. the left bolt of one of the top and bottom pairs, and then the right bolt of the other pair. It has been found that two bushings 20, disposed around bolts on opposing corners (one top and one bottom), are generally sufficient to overcome the shear forces.

While the current invention envisions the use of two bushings 16, it is also possible, within the scope of the present invention, to use four bushings 16, one for each mounting bolt 14. Preferably, the bushings are made of steel. It is also preferable for the holes 16 in the pilot web 12 and the holes 18 in the carrier assembly 10 to each be counter bored to accept the bushing.

Figure 3:
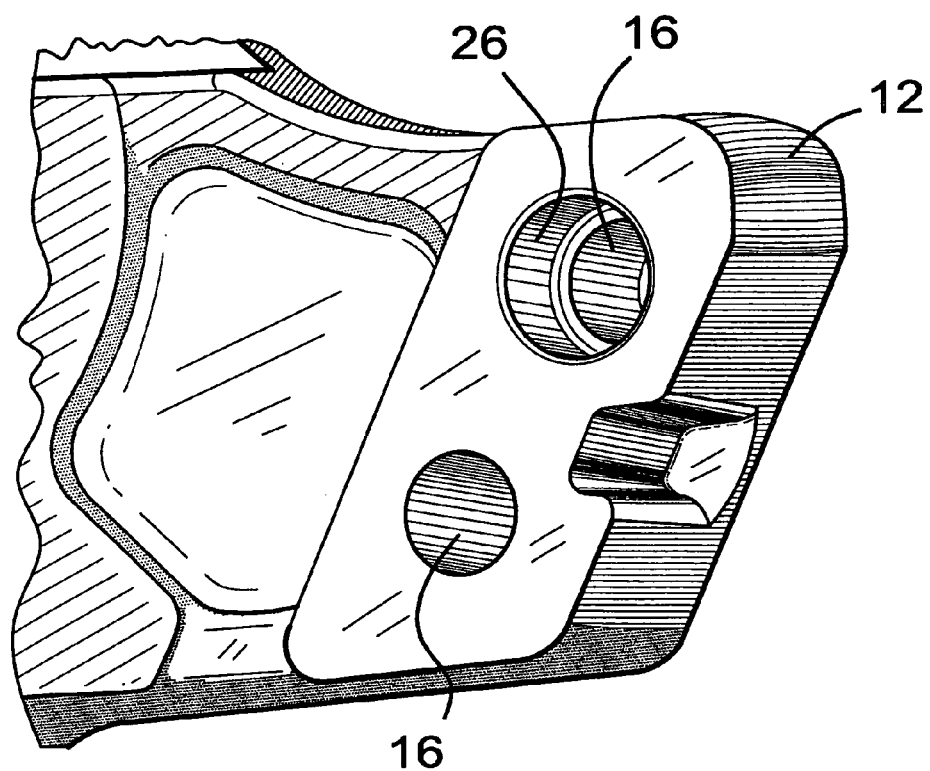
FIG. 3 is a partial view of an embodiment of the pilot web of the invention.

FIG. 3 illustrates a hole 16, in the pilot web 12 having a counter bore 26. As can be seen in this embodiment, there is only the necessity of one counter bore 26 in this end of the pilot web, as this figure illustrates an embodiment of the invention utilizing only two bushings 20. In an embodiment utilizing 4 bushings, each of the holes would advantageously be counter bored.

Figure 4:
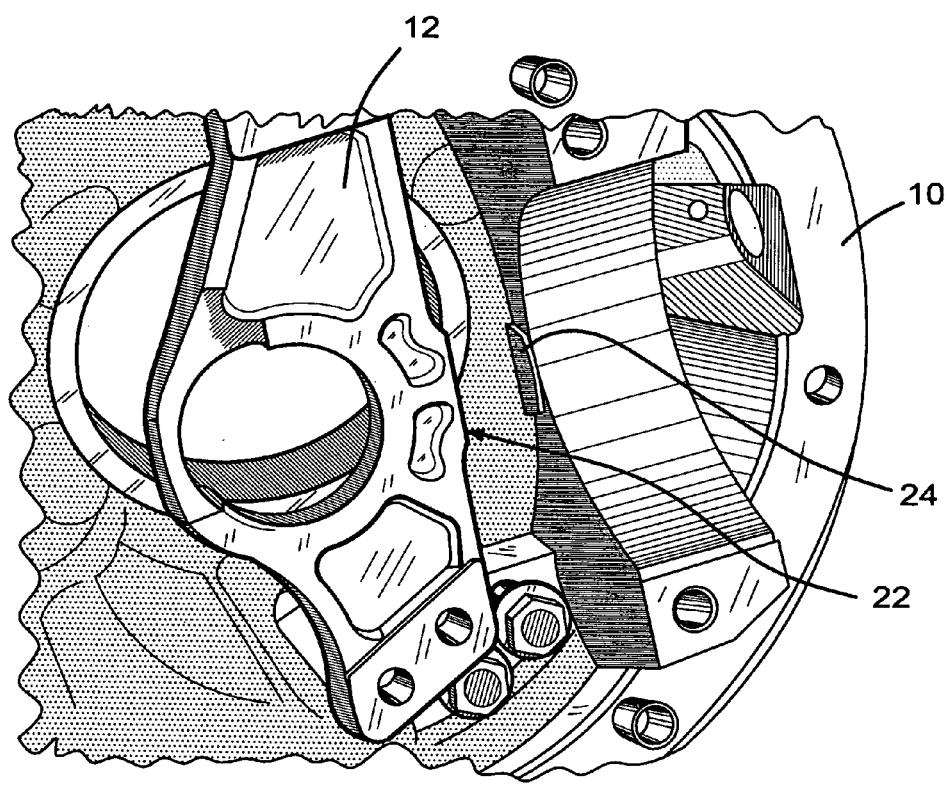
FIG. 4 is an additional exploded view of the pilot web and carrier assembly of the present invention.

FIG. 4 illustrates an embodiment of the present invention wherein the pilot web 12 is again not shown attached to the carrier 10, but is instead shown in much closer proximity. The web 12 has a stop 22 which is positioned adjacent to a stop 24 projecting from the carrier 10. Because there will tend to be deflections of the structure under load, with the stop 22 of the carrier deflecting towards the stop 24 of the web, these stops 22, 24 must be precision machined to a very high tolerance, to minimize the clearance therebetween. A minimal clearance between the stops 22, 24 is necessary for assembly. Preferably, the stops are machined so that there is only about a few thousands of an inch clearance between them. Most preferably, the clearance is about 0.002" or less between the stops 22, 24. Clearance between the stops 22, 24 results in bearing reaction forces being transferred from the pilot web 12 into the carrier assembly 10, upon the gap being closed when under load. The minimal clearance between the stops 22, 24 results in the combination of stops essentially functioning as a single unit and maximizing the bearing forces transferred. The combination of precision machined gap between stops 22, 24 and the use of the bushings 20 described above provides component stiffness approaching that of a pilot web that is cast directly onto the carrier.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A pilot web and differential carrier assembly, comprising:
   a pilot web comprising a first end and a second end, at least one aperture is located at each of said first and second ends;
   a differential carrier comprising at least two apertures in complementary locations to said apertures of said pilot web;
   a first stop on said pilot web, said stop being located at substantially the midpoint between said first end and said second end;
   a second stop on said differential carrier, said second stop being disposed adjacent to, and aligned with, said first stop, wherein said first and second stops define a gap therebetween;
   at least two bolts disposed through said respective apertures of said pilot web and said differential carrier; and
   at least two bushings, said bushings being disposed about corresponding ones of said at least two bolts.

2. The pilot web and differential carrier assembly according to claim 1, wherein each end of said pilot web comprises a single aperture, and said differential carrier comprises two apertures in complementary locations to said apertures of said pilot web.

3. The pilot web and differential carrier assembly according to claim 1 wherein each end of said pilot web comprises two apertures, and said differential carrier comprises four apertures in complementary positions to said apertures of said pilot web.

4. The pilot web and differential carrier assembly according to claim 3, comprising four bolts disposed through said complementary apertures of said pilot web and said differential carrier.

5. The pilot web and differential carrier assembly according to claim 3, comprising four bushings, each of said bushings being disposed about a corresponding one of said bolts.

6. The pilot web and differential carrier assembly according to claim 3, comprising two bushings, one of said bushings being disposed about a corresponding one of said bolts at said first end of said pilot web, and the other of said bushing being disposed about a corresponding one of said bolts at said second end of said pilot web.

7. The pilot web and carrier assembly according to claim 1, wherein each of said apertures in said pilot web and each of said apertures in said differential carrier which correspond to one of said bushings is counter bored to receive the bushing.

8. The pilot web and carrier assembly according to claim 1, wherein each of said bushings comprises steel.

9. The pilot web and carrier assembly according to claim 1, wherein the gap between said first stop and said second stop is about 0.002 inch when not under load.

10. The pilot web and carrier assembly according to claim 1, wherein the gap between said first stop and said second stop is selected to essentially maximize transfer of forces from the pilot web to the carrier.

* * * * *